United States Patent [19]

Bainbridge et al.

[11] Patent Number: 5,180,602
[45] Date of Patent: Jan. 19, 1993

[54] METHOD AND APPARATUS FOR CONTROLLED MOLDING OF CHOCOLATE SHELL GOODS AND THE LIKE

[75] Inventors: Ross S. Bainbridge, Wyoming, Mich.; Gordon Steels, Petersborough, England

[73] Assignee: APV Baker Inc., Grand Rapids, Mich.

[21] Appl. No.: 747,264

[22] Filed: Aug. 19, 1991

[51] Int. Cl.⁵ .......................... A23G 7/00; B65G 47/00
[52] U.S. Cl. ........................................ 426/515; 118/13; 118/31; 118/408; 118/708; 198/377; 198/404; 425/435; 426/660
[58] Field of Search ................ 426/515, 660; 118/13, 118/31, 408, 708; 198/377, 404; 425/435; 264/303

[56] References Cited

U.S. PATENT DOCUMENTS

| | | | |
|---|---|---|---|
| 2,222,745 | 11/1940 | Heidelmeyer | 198/402 |
| 2,240,214 | 4/1941 | Heidelmeyer et al. | 198/792 |
| 2,716,478 | 8/1955 | Wehmiller et al. | 198/792 |
| 3,067,859 | 12/1962 | Jacobsen | 198/404 |
| 3,098,554 | 7/1963 | Zeligowsky | 198/403 |
| 3,150,761 | 9/1964 | Pinault et al. | 198/812 |
| 3,211,033 | 10/1965 | Sporte et al. | 198/812 |
| 3,289,815 | 12/1966 | Richter et al. | 198/812 |
| 3,506,105 | 4/1970 | Stauber | 198/812 |
| 3,550,749 | 12/1970 | Story | 198/431 |
| 3,556,280 | 1/1971 | Schnee | 198/431 |
| 3,854,569 | 12/1974 | Steinhart et al. | 198/431 |
| 4,128,377 | 12/1978 | Bramati | 198/403 |
| 4,141,443 | 2/1979 | Halsey | 198/812 |
| 4,155,441 | 4/1979 | Albrecht et al. | 198/431 |
| 4,210,237 | 7/1980 | Gram | 198/461 |
| 4,505,220 | 3/1985 | Bank | 118/31 |
| 4,519,304 | 5/1985 | Ripani | 99/489 |
| 4,588,599 | 5/1986 | Cerboni | 426/515 |
| 4,881,635 | 11/1989 | Raschke | 198/461 |
| 5,079,022 | 1/1992 | Jeanneret | 426/660 |

Primary Examiner—George Yeung
Attorney, Agent, or Firm—Price, Heneveld, Cooper, DeWitt & Litton

[57] ABSTRACT

The specification discloses an apparatus for making confectionary or other shell goods by the method of filling a mold with a desired media and then inverting the mold to drain the media from the mold while leaving the mold coated by a layer of the media, thereby forming a hollow shell inside the mold. The mold travels through the apparatus on a conveyor. A sliding table is used to provide a turning point which defines the mechanism by which the mold is inverted. The sliding table receiprocates back and forth between extended and retracted positions along the direction of travel of the conveyor so that the speed of inverting the mold can be increased as the sliding table is retracted or decreased as the sliding table is extended.

31 Claims, 5 Drawing Sheets

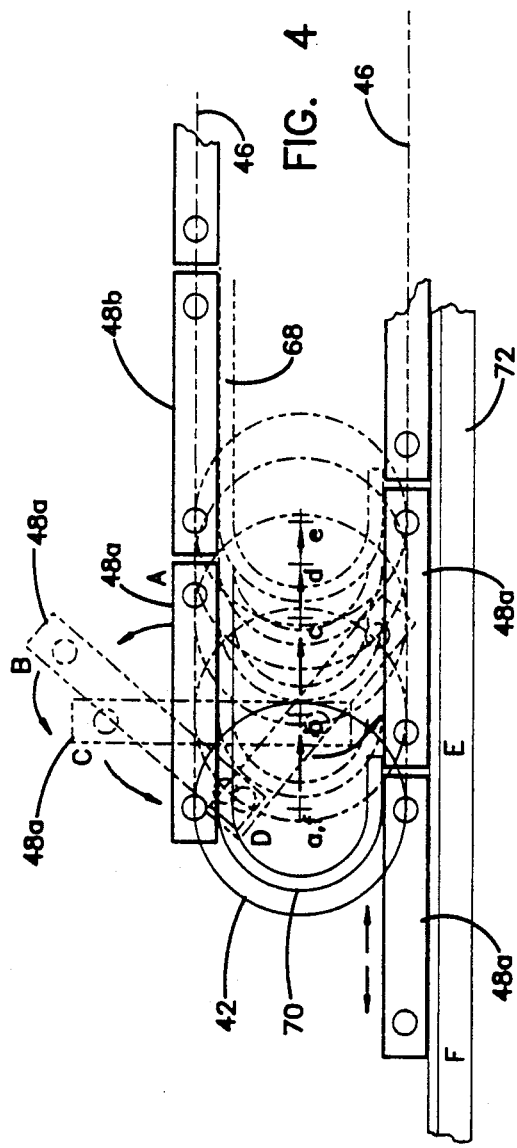
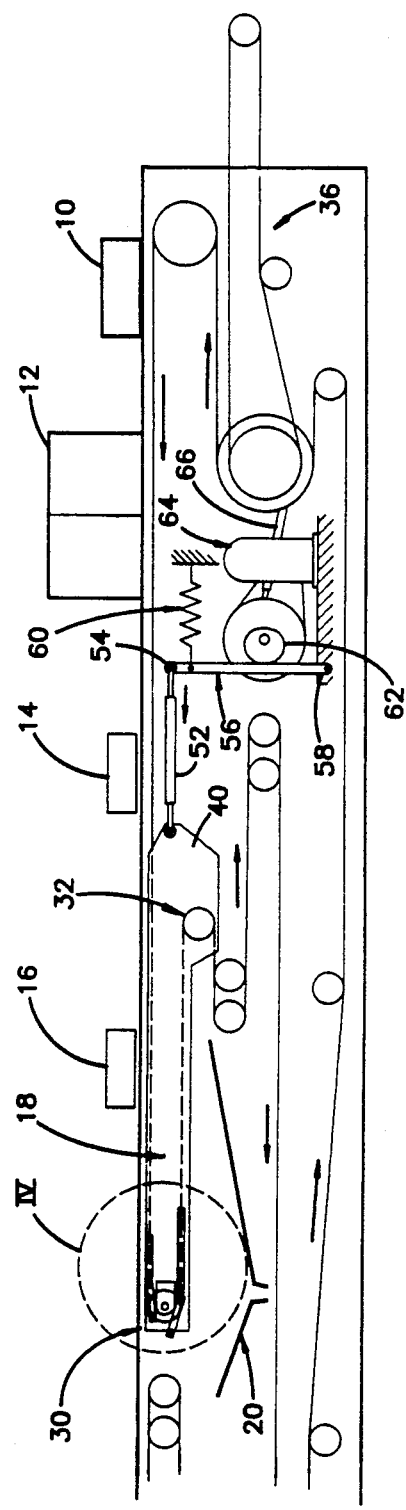
FIG. 4
FIG. 3

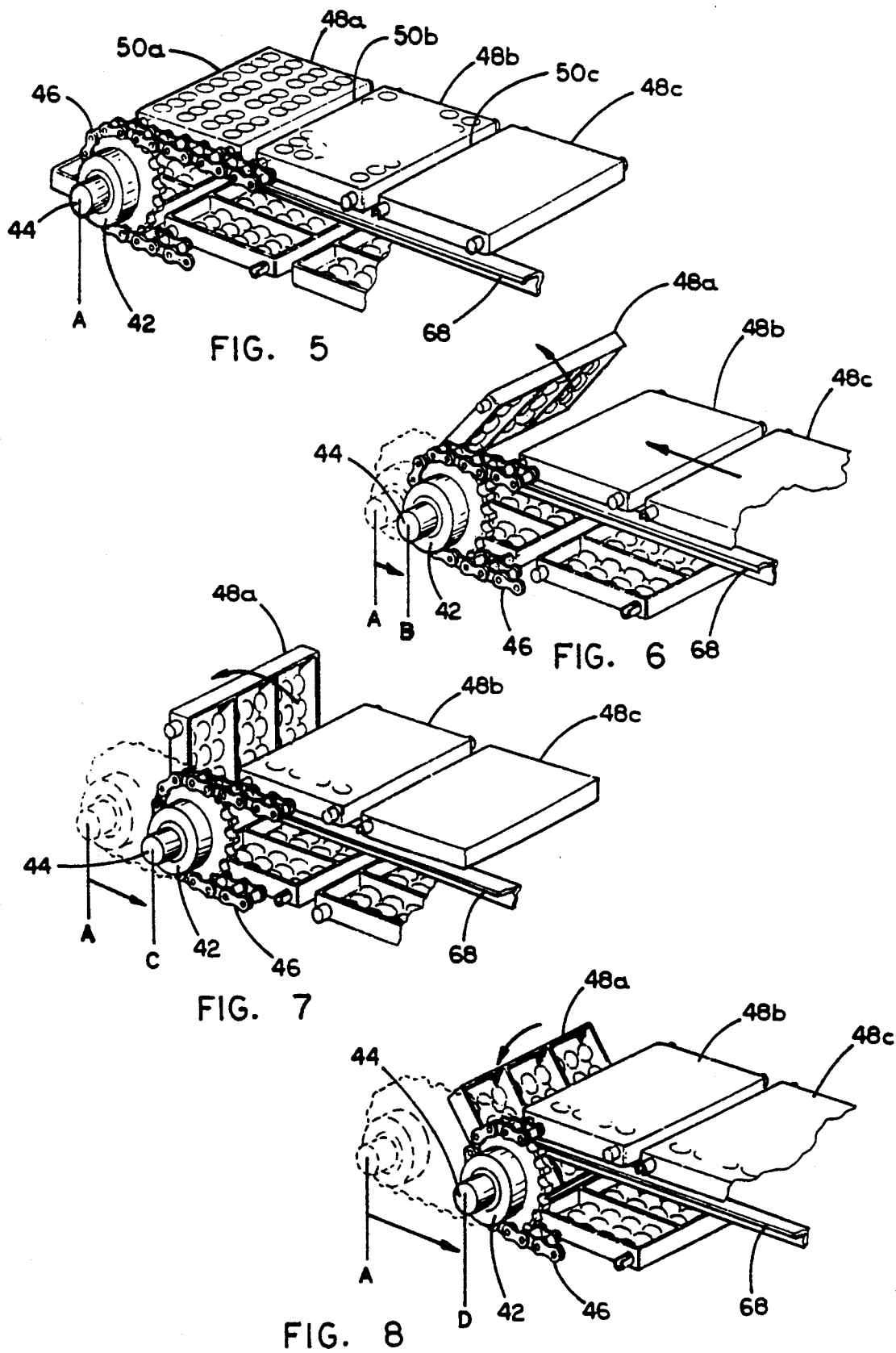

METHOD AND APPARATUS FOR CONTROLLED MOLDING OF CHOCOLATE SHELL GOODS AND THE LIKE

BACKGROUND OF THE INVENTION

This invention relates to the forming of shell goods, and particularly to forming confectionary or other such shell goods by filling a mold with a liquid molding media and then inverting the mold to drain most of such media from the mold while leaving the mold coated by a layer of the media. More particularly, the invention relates to the formation of a confectionery or other such shell in a captive mold plant wherein each mold is connected to a conveyor media, such as the commonly known link chain or serpentine belt.

Compared to a free mold plant, wherein each mold pushes preceding molds through key areas of a manufacturing process, a captive mold plant is desirable for many applications because a mold in a captive mold plant progresses through the plant in a tightly controlled manner obviating many mechanical and operational complexities which are involved with free mold plants. The captive mold plant is particularly advantageous where a multitier conveyor circuit is desired in order to minimize space requirements for economic reasons and the like.

A major factor in the effectiveness of the captive mold plant is the fact that the conveyor proceeds at a specifically controlled pace. However, this can be a detriment to the proper forming of a confectionery or other shell.

According to the shell-forming technique which is presently of interest, an upwardly open mold cavity is completely filled with a liquid confection, such as molten chocolate for example, and then quickly inverted, allowing the chocolate to drain uniformly down the sides of the mold cavity to produce a coating of chocolate over the interior surface of the mold cavity. As the chocolate coating cools, it solidifies to form a chocolate shell. However, if the mold is inverted too slowly, the liquid chocolate will remain in contact with the low or leading side of the mold considerably longer than the opposite side. This will result in a thicker coating of chocolate building up on the leading side of the mold, and result in an unsatisfactory shell. In the past, the speed at which a mold could be turned over to make the confectionery shell has been dictated by the geometry of the mold and of the turning point. Even with the most advantageous geometry, however, the turnover speed has been too slow to produce a thin, uniform, and truly desirable shell.

A typical prior art arrangement is shown in U.S. Pat. No. 3,067,859, entitled TILTING MECHANISM IN MOLD CONVEYORS IN PLANTS FOR MOLDING CHOCOLATE AND SIMILAR MASSES and issued on Dec. 11, 1962 to Jacobsen. In the Jacobsen mechanism, each mold is pivotally connected near its center to a conveyor chain and is provided with guide rollers near its ends for following guide rails. A recess in the guide rails causes the leading guide roller to drop into the recess while the conveyor chain pulls the midpoint of the mold over the leading roller, levering the trailing roller ahead of the leading roller and turning the mold over. As would be apparent to one skilled in the art, this is a relatively slow turnover process and depends upon the geometry of the tray and of the turning point. Depending upon the geometry actually used, the mold can actually pause during the mold turnover, causing a substantial build-up of chocolate on the leading side of the mold. As would also be apparent, it would be impractical, and not really feasible, to compensate for such geometry by periodically accelerating and decelerating the conveyor as each mold approaches and passes the turning point.

SUMMARY OF THE INVENTION

The present invention effectively resolves the limitations discussed above by providing means and method to control the speed of turning the mold over. In one aspect of the invention, a sliding turning-point table is provided along the mold conveyor so that the effective conveyor speed in the immediate vicinity of the turning point may be accelerated and decelerated by the relative motion of the sliding table. In another aspect of the invention, the motion of the sliding table may be controlled independently of the mold conveyor, and control of the sliding table may be synchronized to the conveyor.

The foregoing features and attributes of the invention will become more apparent after contemplation of the ensuing more detailed description, particularly when considered with and in light of the accompanying drawings.

BRIEF DESCRIPTION OF THE DRAWINGS

FIG. 3 is a fragmentary, detailed schematic showing the path of the conveyor of the plant of FIG. 1 in the vicinity of a sliding turning-point table according to the present invention;

FIG. 4 is a fragmentary, detailed schematic representation showing the path of the turning point of the sliding table of FIG. 3 and showing the path of a mold traveling around the turning point;

FIG. 5 is a fragmentary perspective view of the turning point at position A of FIG. 4;

FIG. 6 is a fragmentary perspective view of the turning point at position B of FIG. 4;

FIG. 7 is a fragmentary perspective view of the turning point at position C of FIG. 4;

FIG. 8 is a fragmentary perspective view of the turning point at position D of FIG. 4.

DESCRIPTION OF THE PREFERRED EMBODIMENT

Figure 1:
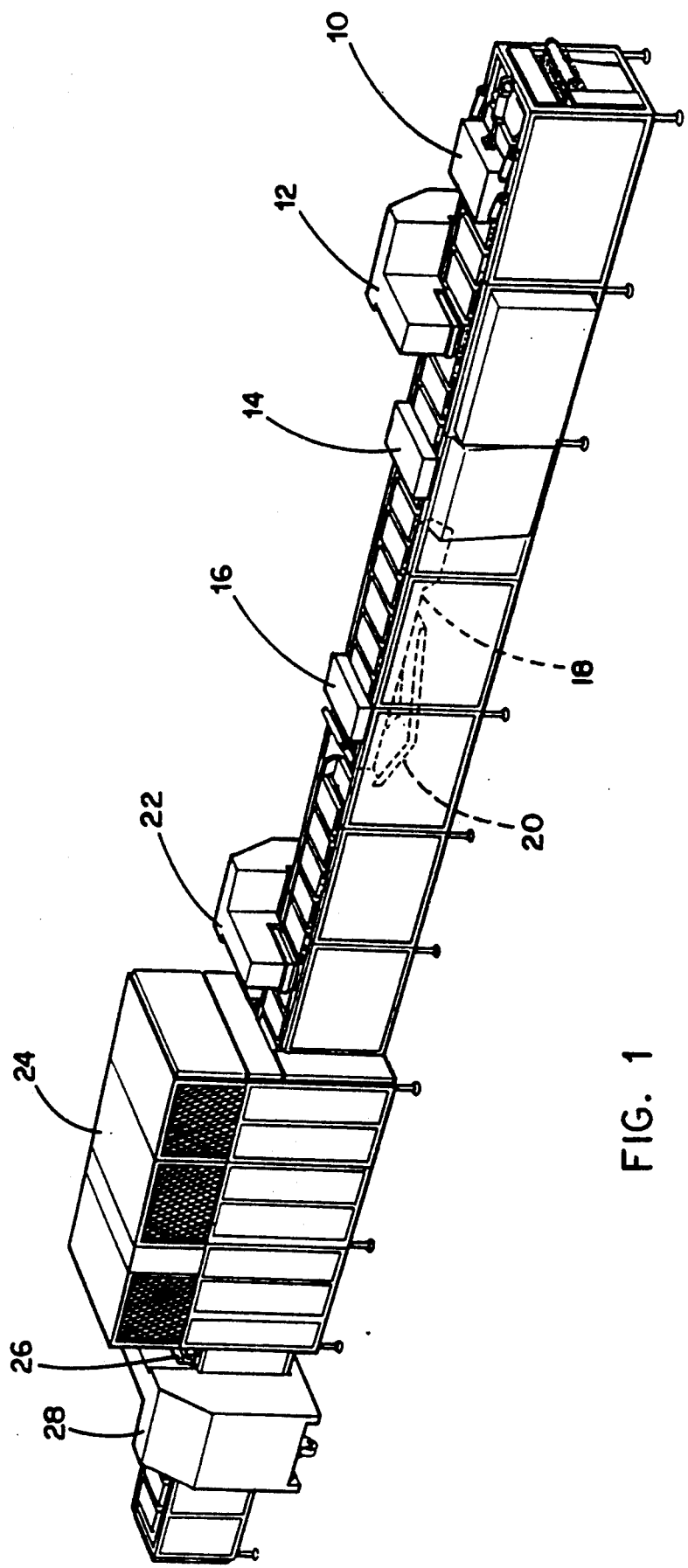
FIG. 1 is a perspective view of a confection manufacturing plant which incorporates the present invention.

With reference to FIG. 1, a three-stage confectionary plant employing the turning point concept of the present invention is shown. Such a plant incorporates a captive mold conveyor and comprises a mold heater 10, shell depositor 12, shakers 14 and 16, sliding turning-point table 18, chocolate collection trough 20, center depositor 22, cooler 24, mold heater 26 and bottom depositor 28. Generally speaking, these are all known components on an individual basis, but pointed out further below the inclusion of the variable (movable) turning-point mechanism and concept in such an apparatus is not known heretofore and this as well as the resulting new combination thus represents a new and meritorious contribution to the art.

Figure 2:
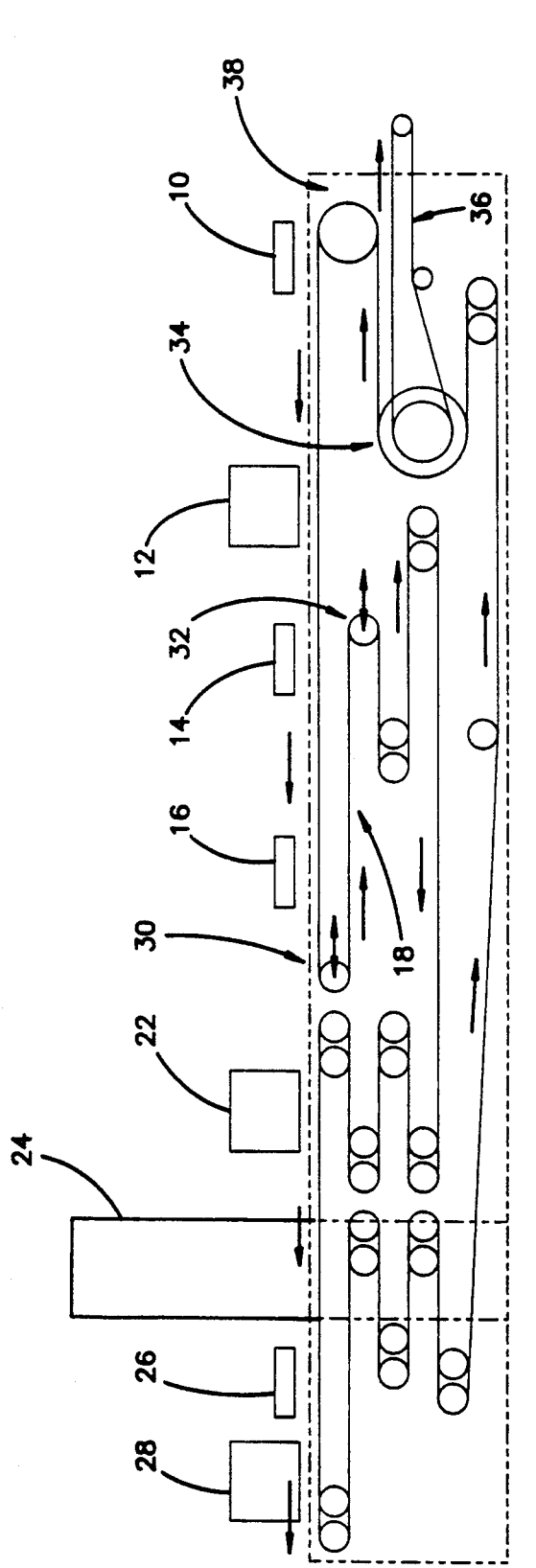
FIG. 2 is a schematic representation showing the functional conveyor path of the plant of FIG. 1.

A schematic representation of the path followed by a mold through the plant of FIG. 1 is shown in FIG. 2. The process starts with an empty mold (not specifically shown) which is initially heated (warmed) by mold heater 10. The mold (comprising one or more upwardly open, hollow vessels or recesses) is then filled by shell depositor 12 with a confection such as molten chocolate. Mold shakers 14 and 16 then shake the filled mold to minimize the occurrence of any voids caused by air bubbles in the confection. The mold is then quickly inverted as it travels around turning point 30 and the turning point is simultaneously withdrawn to accelerate the mold inversion. Conversely, turning point 30 may be extended to slow the turning rate if the particular confection being made so requires. Upon inversion of the mold, the confection drains from it leaving a thin layer of the confection coating the interior surfaces of the mold. The inverted mold is again inverted (i.e., righted) at the reversing point 32. From this point forward, the mold travels past the center depositor 22 to receive a confectionery center filling. The mold then passes through cooler 24 to set the center filling, and then passes the heater 26 which slightly melts or softens the adjacent end portions of the filled chocolate shell prior to receiving a bottom layer for the confection from bottom depositor 28. The mold again passes through the cooler 24 a desired number of times prior to removal of the confection from the mold as the mold travels around the demolding turnover point 34. The confections are then discharged from the plant by discharge conveyor 36 and the mold is again returned to its initial upright position at turnover point 38, prior to passing by mold heater 10 once again and repeating the above-described cycle.

The path of the conveyor in the vicinity of sliding table 18 is shown in greater detail in FIG. 3. Sliding table 18 comprises a frame 40 which is slideably mounted on the conveyor support structure to move back and forth along the direction of travel of the conveyor, between an extended position and a retracted position. Frame 40 carries a pair of nose wheels 42 (FIG. 4) which are mounted to the frame by an axle 44 (FIGS. 5-8). The conveyor comprises a pair of parallel roller chains 46 which move in unison along either side of the conveyor path and carry a series of molds 48 which are captured therebetween. Each mold 48, shown here as a tray defining a plurality of molding cavities, is connected to chains 46 near the leading edge 50 of the mold.

The sliding table 18 is actuated by a cam and lever arrangement including a link 52 (FIG. 3) connected between the sliding table 18 and the free end 54 of a lever 56. The lever 56 has a second end, opposite to its free end 54, which is pivotally connected to the frame work of the confectionery plant at 58. A spring mechanism 60 is provided for biasing lever 56 against a cam 62. Cam 62 is rotatably driven through a belt or the like by a motor assembly 64, and is connected by a ratchet link 66 to the conveyor through the roller located at demolding turnover point 34 at which the conveyor is or may also be driven from motor assembly 64. By connecting the conveyor to cam 62 in this manner, the conveyor motion is synchronized with the cam position and is thus synchronized with the sliding table position.

Figure 9:
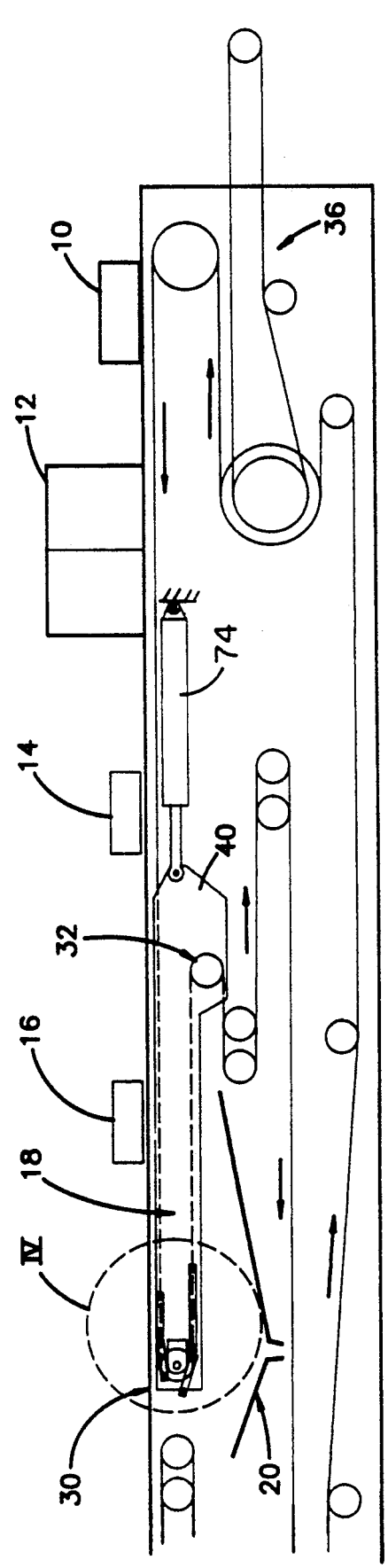
FIG. 9 is the fragmentary, detailed schematic analogous to FIG. 3 but showing an alternative embodiment of a device for actuating the sliding turning-point table.

In the alternative, lever 56, spring mechanism 60 and cam 62 may be eliminated and link 52 may be replaced with a double-acting motor such as a pneumatic or hydraulic cylinder 74, or other such device for reciprocating sliding table 18 (FIG. 9). In such an alternative embodiment, a cyclical cylinder control device may be actuated in synchronization with the conveyor by use of known means.

The process of inverting each mold 48 is more specifically shown in FIGS. 4-8. By retracting slide table 18, that is sliding the table opposite to the direction of travel of the conveyor, the effective speed at which a mold 48 travels around nose wheels 42 can be increased. The faster that sliding table 18 is retracted, the faster that a mold 48 travels around nose wheels 42 and the faster mold 48 is inverted.

The cam 62 may be synchronized with the conveyor so that the sliding table 18 is pulled from the extended position to a retracted position by link 52 when the leading edge 50 of a mold 48 is positioned over the axle 44 of nose wheels 42. As shown in FIGS. 4-8, as sliding table 18 is retracted (i.e. moved to the right as shown in these figures), nose wheels 42 are progressively moved away from beneath the mold 48a thereby shifting the reversing point 30 to the right beneath the mold and rapidly inverting it, effectively increasing the speed of the conveyor around this reversing point. As this occurs, reversing point 32, which is also attached to frame 40, acts in concert to keep the conveyor chain 46 tight against nose wheels 42 so that the leading edge 50a is pulled down and around the nose wheels 42.

The molds 48 slide along guide rails 68, which are also attached to frame 40. The guide rails 68 are generally J-shaped with an arcuate end portion 70 which is concentric with the nose wheels 42 (FIG. 4). The leading edge 50a of mold 48a is pulled by chains 46 around nose wheels 42 and the body of mold 48a is guided by the curved end portion 70 of guide rails 68 so that the body of mold 48a pivots around the connection point of the mold to the chains 46, near the leading edge 50a, flipping the mold 48a over and inverting it. The inverted mold 48 is received at position "E" by lower guide rails 72 (FIG. 4).

The schematic drawing of FIG. 4 shows the transition of a mold 48 through positions "A-F" as the sliding table 18 is retracted from the extended position "a" to the retracted position "e" and extended back to position "f", which is also the starting point or position "a." When the sliding table 18 reaches the fully retracted position "e", the next mold 48b is in position, relative to the nose wheels 42, for turning and remains in that relative position while the sliding table 18 moves back to the extended position "a", i.e. travels with the conveyor in unison with the sliding table, at which point the above-described turnover process proceeds with the next mold 48b.

As will be appreciated by those skilled in the art, the present invention thus provides a novel and effective way of achieving the desirable and needed end of more uniform and thin shell goods, and particular confection shell goods, through rapid mold inversion, and it accomplishes this without drastic revision and/or replacement of generally-accepted production equipment. Indeed, it may be possible to effectively implement the invention in some cases by modifying an existing plant or equipment, but in any event has the desirable attribute of using, or being directly consistent with, known and accepted shell goods manufacturing machinery and components. As will be recognized, use in conjunction with various molding materials (media) is within the overall scope of the invention, even through the particular application discussed above is in the field of confection shell goods, particularly of chocolate It is to be understood that the foregoing description of a preferred embodiment of the invention is provided for purposes of the description and illustration, and not as a measure of the invention, whose scope is to be defined by reference to the ensuing claims. Thus, those skilled in the art may devise embodiments of the particular concepts presented in the foregoing illustrative disclosure which differ from the particular embodiment shown and described in detail herein, or may make various changes in structural details to the illustrated embodiment. Accordingly, all such alternatives or modified embodiments which utilize the underlying concepts of the invention and incorporate the spirit thereof are to be considered as within the scope of the claims appended here below, unless such claims by their language specifically state otherwise.

The embodiments of the invention in which an exclusive property or privilege is claimed and defined as follows:

1. In an apparatus for making shell goods, said apparatus having at least one mold means for molding at least one generally hollow shell, having conveyor means for conveying said mold means through said apparatus, having filling means for at least partially filling said mold means with a molding media and having means for inverting said mold means to drain said media from said mold means after said mold means is at least partially filled therewith by said filling means to thereby leave said mold means at least partially coated by a layer of said media to form a shell, the improvement comprising means for controlling the thickness of said layer and shell by changing the speed of inverting said mold means.

2. The improvement defined in claim 1 wherein said controlling means comprises at least one movable member defining a loop in said conveyor means, said member being mounted in said conveyor means to control the travel of said conveyor at said inverting means.

3. The improvement defined in claim 2 wherein said movable member comprises a table having a first end defining a turning point around which said conveyor means wraps to reverse the direction of travel of said conveyor means, has a second end defining a reverse point around which said conveyor wraps to again reverse the direction of travel of said conveyor means, and is mounted to reciprocate back and forth along the direction of conveyance of said conveyor means between an extended position and a retracted position.

4. The improvement defined in claim 3 wherein said turning point defines said means for inverting said mold means to drain said media from said mold means, said table being movable from said extended position to said retracted position to increase said speed of inverting said mold means by moving said turning point in a first direction and said table being movable from said retracted position to said extended position to decrease said speed of inverting said mold means by moving said turning point in a second direction.

5. The improvement defined in claim 4 further including actuator means for moving said table between said extended and retracted positions.

6. The improvement defined in claim 5 wherein said actuator means is synchronized to the operation of said conveyor means.

7. The improvement defined in claim 5 wherein said actuator means includes a lever, said lever having a first end operatively connected to said table and a second end pivotally mounted to said conveyor means, and further includes a cam means for moving said lever to operatively slide said sliding table.

8. The improvement defined in claim 7 wherein said cam means is synchronized to the operation of said conveyor means.

9. The improvement defined in claim 5 wherein said actuator means includes a fluid-actuated cylinder connected between said table and said conveyor and further includes means for actuating said cylinder in synchronization with the operation of said conveyor.

10. The improvement defined in claim 5 wherein said fluid-actuated cylinder includes a pneumatic cylinder.

11. An apparatus for making confections comprising;
at least one mold means for forming at least one confectionery shell;
conveyor means for conveying said mold means through said apparatus;
means for depositing a confection into said mold means;
turning means for turning said mold means over to drain a portion of said confection from said mold means in a manner leaving at least portions of said mold means coated with a layer of said confection; and
means for controlling the thickness of said layer by controlling the speed of turning said mold means over.

12. The apparatus defined in claim 11 wherein said controlling means comprises at least one movable member defining a loop in said conveyor means, said movable member being mounted in said conveyor means to control the travel of said conveyor at said turning means.

13. The apparatus defined in claim 12 wherein said movable member comprises a table having a first end defining a turning point around which said conveyor means wraps to reverse the direction of travel of said conveyor means, has a second end defining a reverse point around which said conveyor wraps to again reverse the direction of travel of said conveyor means, and is mounted to reciprocate back and forth along the direction of conveyance of said conveyor means between an extended position and a retracted position.

14. The apparatus defined in claim 13 wherein said turning point defines said means for inverting said mold means to drain said confection from said mold means, said table being movable from said extended position to said retracted position to increase said speed of inverting said mold means by moving said turning point in a first direction and said table being movable from said retracted position to said extended position to decrease said speed of inverting said mold means by moving said turning point in a second direction.

15. The apparatus defined in claim 14 further including actuator means for moving said table between said extended and retracted positions.

16. The apparatus defined in claim 15 wherein said actuator means is synchronized to the operation of said conveyor means.

17. The apparatus defined in claim 15 wherein said actuator means includes a lever, said lever having a first end operatively connected to said table and a second end pivotally mounted to said conveyor means, and further includes a cam means for moving said lever to operatively slide said sliding table.

18. The apparatus defined in claim 17 wherein said cam means is synchronized to the operation of said conveyor means.

19. The apparatus defined in claim 16 wherein said actuator means includes a fluid-actuated cylinder connected between said table and said conveyor and further includes means for actuating said cylinder in synchronization with the operation of said conveyor.

20. The improvement defined in claim 15 wherein said fluid-actuated cylinder includes a pneumatic cylinder.

21. A sliding table for use in an apparatus for making confections, said apparatus having at least one mold means for molding at least one confectionery shell, having conveyor means for conveying said mold means through said apparatus, and having means for depositing confection material upon said mold means, said sliding table comprising turning means for turning said mold means to drain said confection therefrom so that said mold means remains coated by a layer of said confection material after being so drained.

22. The improvement defined in claim 21 wherein said sliding table at least partially defines a loop in said conveyor means and is slideably mounted in said conveyor means for controlling the travel of said conveyor at said turning means.

23. The improvement defined in claim 22 wherein said sliding table has a first end portion defining said turning means, said first end portion comprising a nose around which said conveyor means wraps to change the direction of travel of said conveyor means, has a second end portion defining a bend around which said conveyor wraps to again change the direction of travel of said conveyor means, and slides back and forth along the direction of conveyance of said conveyor means between an extended position and a retracted position.

24. The improvement defined in claim 22 wherein said sliding table slides from said extended position to said retracted position to increase said speed of turning said mold means over as said mold means turns over by traveling around said nose and said sliding table slides from said retracted position to said extended position to decrease said speed of turning said mold means over as said mold means turns over by traveling around said nose.

25. The improvement defined in claim 24 further including actuator means for moving said sliding table between said extended and retracted positions.

26. The improvement defined in claim 25 wherein said actuator means is synchronized to the operation of said conveyor means.

27. The improvement defined in claim 25 wherein said actuator means includes a lever, said lever having a first end operatively connected to said sliding table and a second end pivotally mounted to said conveyor means, and includes a cam means for bearing upon said lever to operatively slide said sliding table.

28. The improvement defined in claim 27 wherein said cam means is synchronized to the operation of said conveyor means.

29. A method of controlling the speed of turning a confectionery shell mold in an apparatus for making confections, the apparatus having a conveyor for conveying the mold through the apparatus and having means for depositing confection material into the mold, comprising the steps of:
    turning the conveyor in a manner causing inversion of a mold containing said confection material to drain said material from the mold while leaving a layer of the material coating the mold to form a confectionery shell;
    reversing the conveyor to return the mold to an upright position after said turning and during the course of travel of the conveyor; and
    moving the location where said turning occurs between a first position and a second position upstream along the direction of travel of the conveyor with respect to said first position when the conveyor has conveyed the mold to a location near said first position and the conveyor is about to be turned to cause inversion and draining of said mold.

30. The method of claim 29 wherein said turning and said reversing of said conveyor is carried out in synchronization.

31. The method defined in claim 29 wherein turning and reversing of said conveyor is done by use of a sliding turning point table for moving the location of said turning and said reversing between extended and retracted positions of said table, said table having a first end at which said turning is accomplished and having a second end at which said reversing is accomplished.

* * * * *